US010050484B2

United States Patent
Tamura

(10) Patent No.: US 10,050,484 B2
(45) Date of Patent: Aug. 14, 2018

(54) STATOR FOR ROTATING ELECTRIC MACHINE

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 15/048,220

(22) Filed: Feb. 19, 2016

(65) Prior Publication Data
US 2016/0248291 A1 Aug. 25, 2016

(30) Foreign Application Priority Data
Feb. 19, 2015 (JP) .................................. 2015-030647

(51) Int. Cl.
*H02K 3/12* (2006.01)
*H02K 3/38* (2006.01)
*H02K 3/28* (2006.01)

(52) U.S. Cl.
CPC .................. *H02K 3/28* (2013.01); *H02K 3/12* (2013.01); *H02K 3/38* (2013.01)

(58) Field of Classification Search
CPC .. H02K 3/12; H02K 3/14; H02K 3/28; H02K 3/38
See application file for complete search history.

(56) References Cited

U.S. PATENT DOCUMENTS

| 5,982,068 A | 11/1999 | Umeda et al. |
| 7,005,772 B1 | 2/2006 | Frederick et al. |
| 2010/0117480 A1 | 5/2010 | Ishizuka et al. |
| 2011/0012472 A1 | 1/2011 | Umeda et al. |

FOREIGN PATENT DOCUMENTS

| JP | H11-164506 A | 6/1999 |
| JP | 2003-264964 A | 9/2003 |
| JP | 2011-109894 A | 6/2011 |

*Primary Examiner* — Ramon M Barrera
(74) *Attorney, Agent, or Firm* — Oliff PLC

(57) ABSTRACT

A stator includes a stator core having slots arranged in a circumferential direction thereof at a predetermined pitch and a stator coil comprised of phase windings. Each of the phase windings is configured with an electric conductor and an insulating coat covering the electric conductor. Each of the phase windings includes in-slot portions and turn portions connecting the in-slot portions. The turn portions of the phase windings include a plurality of types of turn portions having different circumferential lengths. For each of the phase windings, apex parts of the turn portions of the phase winding are arranged in pairs over the entire circumferential range of the stator coil. The apex parts of each of the pairs axially overlap each other. Each circumferentially-adjacent pair of the apex parts of the turn portions of all the phase windings are circumferentially offset from each other by a distance greater than the predetermined pitch.

5 Claims, 7 Drawing Sheets

STATOR FOR ROTATING ELECTRIC MACHINE

CROSS-REFERENCE TO RELATED APPLICATION

This application is based on and claims priority from Japanese Patent Application No. 2015-30647 filed on Feb. 19, 2015, the content of which is hereby incorporated by reference in its entirety into this application.

BACKGROUND

1. Technical Field

The present invention relates to stators for rotating electric machines that are used in, for example, motor vehicles as electric motors and electric generators.

2. Description of Related Art

There are known rotating electric machines that are used in motor vehicles as electric motors and electric generators. These rotating electric machines generally include a rotor and a stator. The stator includes an annular stator core and a stator coil. The stator core is disposed in radial opposition to the rotor and has a plurality of slots arranged in a circumferential direction thereof. The stator coil is comprised of a plurality of phase windings that are mounted on the stator core so as to be received in the slots of the stator core and be different in electrical phase from each other.

Japanese Patent Application Publication No. JP2011109894A (to be referred to as Patent Document 1 hereinafter) discloses a three-phase stator coil 140 as shown in FIG. 11. The stator coil 140 is comprised of a plurality of phase windings mounted on a stator core 130. Each of the phase windings is formed of a plurality of substantially wave-shaped electric wires; each of the electric wires is configured with an electric conductor having a substantially rectangular cross-sectional shape and an insulating coat that covers the outer surface of the electric conductor. Moreover, each of the phase windings includes a plurality of in-slot portions 151C and a plurality of turn portions 152. Each of the in-slot portions 151C is received in one of slots 131 formed in the stator core 130. Each of the turn portions 152 is located outside the slots 131 of the stator core 130 to connect one pair of the in-slot portions 151 C respectively received in two different ones of the slots 131. Moreover, each of the turn portions 152 includes an apex part 153 that is positioned at the center of the turn portion 152 in the extending direction of the turn portion 152 and extends in the circumferential direction of the stator core 130. Further, at the center of the apex part 153, there is formed a crank-shaped part 154 that is bent to radially offset the turn portion 152. Moreover, those turn portions 152 of the phase windings of the stator coil 140 which are located on a first axial side of the stator core 130 together constitute a first coil end part of the stator coil 140; those turn portions 152 of the phase windings of the stator coil 140 which are located on a second axial side of the stator core 130 together constitute a second coil end part of the stator coil 140.

More specifically, as shown in FIG. 11, the stator coil 140 is wave-wound on the stator core 130 so that each of the turn portions 152 connects a first in-slot portion 151 C arranged at the Nth layer counting from the radially inside in a first slot 131 and a second in-slot portion 151C arranged at the (N−1)th layer counting from the radially inside in a second slot 131 that is away from the first slot 131 by six slot-pitches, where N is a natural number greater than or equal to 2.

However, according to Patent Document 1, each of the electric wires forming the phase windings of the stator coil 140 is press-shaped (or bent), using shaping dies, into the substantially wave shape. That is, the apex parts 153 and crank-shaped parts 154 of the turn portions 152 that constitute the coil end parts of the stator coil 140 are formed by press-shaping. Therefore, at the crank-shaped parts 154 to which a high stress is applied during the press-shaping process, the insulating coats of the electric wires may be damaged, causing the electric conductors to be exposed from the insulating coats. Consequently, creeping discharge (or surface discharge) may occur between those portions of the phase windings of the stator coil 140 where the electric conductors are exposed, thus resulting in an insulation failure.

More specifically, as shown in FIG. 11, the crank-shaped parts 154 of the turn portions 152, where it is easy for exposure of the electric conductors to occur due to damage to the insulating coats during the press-shaping process, are circumferentially offset from one another by only one slot-pitch. Consequently, creeping discharge may occur in the stator coil 140.

Japanese Patent Application Publication No. JPH11164506A (to be referred to as Patent Document 2 hereinafter) discloses a three-phase stator coil 240 as shown in FIGS. 12-14. The stator coil 240 is comprised of a plurality of phase windings mounted on a stator core 130. Each of the phase windings is formed of a plurality of substantially U-shaped electric conductor segments; each of the electric conductor segments is configured with an electric conductor having a substantially rectangular cross-sectional shape and an insulating coat that covers the outer surface of the electric conductor. Moreover, each of the phase windings includes a plurality of in-slot portions 151C and a plurality of turn portions 152. Each of the in-slot portions 151C is received in one of slots 131 formed in the stator core 130. Each of the turn portions 152 is located outside the slots 131 of the stator core 130 to connect one pair of the in-slot portions 151C respectively received in two different ones of the slots 131. Moreover, each of the turn portions 152 includes an apex part 153 that is positioned at the center of the turn portion 152 in the extending direction of the turn portion 152 and extends in the circumferential direction of the stator core 130. Further, at the center of the apex part 153, there is formed a crank-shaped part 154 that is bent to radially offset the turn portion 152. Moreover, all the turn portions 152 of the phase windings of the stator coil 240 are located on the same axial side (i.e., the upper side in FIG. 12) of the stator core 130 and together constitute a coil end part of the stator coil 240.

More specifically, as shown in FIGS. 13-14, before being mounted to the stator core 130, each of the electric conductor segments is substantially U-shaped to have a pair of straight portions extending parallel to each other and a turn portion that connects ends of the straight portions on the same side. In forming the stator coil 240, the straight portions are axially inserted, from a first axial side (i.e., the upper side in FIG. 12) of the stator core 130, respectively into two slots 131 of the stator core 130 which are away from each other by six slot-pitches. Then, free end parts of the straight portions, which protrude outside the slots 131 on a second axial side (i.e., the lower side in FIG. 12) of the stator core 130, are twisted respectively toward opposite circumferential sides. Thereafter, each corresponding pair of distal ends of the twisted free end parts of the electric conductor segments are joined by, for example, welding. Consequently, in the resultant stator coil 240, those parts of the straight portions of the electric conductor segments which are received in the slots 131 of the stator core 130 respectively constitute the in-slot portions 151C of the phase windings of the stator coil 240; the turn portions of the electric conductor segments respectively constitute the turn portions 152 of the phase windings of the stator coil 240.

Moreover, according to Patent Document 2, the electric conductor segments forming the phase windings of the stator coil 240 are comprised of a plurality of large electric conductor segments 150A as shown in FIG. 13 and a plurality of small electric conductor segments 150B as shown in FIG. 14. The turn portions 152 of the large electric conductor segments 150A are larger than the turn portions 152 of the small electric conductor segments 150B. In each of the slots 131 of the stator core 130, there received four of the in-slot portions 151C of the electric conductor segments 150A and 150B in radial alignment with each other.

More specifically, as shown in FIG. 13, each of the large electric conductor segments 150A includes a first in-slot portion 151C arranged at the first layer (i.e., the innermost layer) in a first slot 131, a second in-slot portion 151C arranged at the fourth layer (i.e., the outermost layer) in a second slot 131 that is away from the first slot 131 by six slot-pitches, and one turn portion 152 that connects the first and second in-slot portions 151C. On the other hand, as shown in FIG. 14, each of the small electric conductor segments 150B includes a first in-slot portion 151 C arranged at the second layer in a first slot 131, a second in-slot portion 151 C arranged at the third layer in a second slot 131 that is away from the first slot 131 by six slot-pitches, and one turn portion 152 that connects the first and second in-slot portions 151C. Moreover, each joined-pair of the free end parts of the large and small electric conductor segments 150A and 150B respectively protrude from two slots 131 that are away from each other by six slot-pitches.

However, according to Patent Document 2, each of the electric conductor segments 150A and 150B forming the phase windings of the stator coil 240 is press-shaped (or bent), using shaping dies, into the substantially U-shape. That is, the apex parts 153 and crank-shaped parts 154 of the turn portions 152 that constitute the coil end part of the stator coil 240 are formed by press-shaping. Therefore, at the crank-shaped parts 154 to which a high stress is applied during the press-shaping process, the insulating coats of the electric conductor segments may be damaged, causing the electric conductors to be exposed from the insulating coats. Consequently, creeping discharge may occur between those portions of the phase windings of the stator coil 240 where the electric conductors are exposed, thus resulting in an insulation failure.

More specifically, as shown in the region F of FIG. 13, the crank-shaped parts 154 of the turn portions 152 of the large electric conductor segments 150A, where it is easy for exposure of the electric conductors to occur due to damage to the insulating coats during the press-shaping process, are circumferentially offset from one another by only one slot-pitch. Similarly, as shown in the region G of FIG. 14, the crank-shaped parts 154 of the turn portions 152 of the small electric conductor segments 150B, where it is easy for exposure of the electric conductors to occur due to damage to the insulating coats during the press-shaping process, are also circumferentially offset from one another by only one slot-pitch. Consequently, creeping discharge may occur in the stator coil 240.

SUMMARY

According to one exemplary embodiment, there is provided a stator for a rotating electric machine. The stator includes an annular stator core and a stator coil. The stator core has a plurality of slots arranged in a circumferential direction of the stator core at a predetermined pitch. The stator coil is comprised of a plurality of phase windings that are mounted on the stator core so as to be different in electrical phase from each other. Each of the phase windings is configured with an electric conductor having a substantially rectangular cross-sectional shape and an insulating coat that covers an outer surface of the electric conductor. Each of the phase windings includes a plurality of in-slot portions and a plurality of turn portions. Each of the in-slot portions is received in one of the slots of the stator core. Each of the turn portions is located outside the slots of the stator core to connect one pair of the in-slot portions respectively received in two different ones of the slots. The turn portions of the phase windings of the stator coil include a plurality of types of turn portions having different circumferential lengths. Each of the turn portions of the phase windings includes an apex part that is furthest in the turn portion from an axial end face of the stator core and extends in the circumferential direction of the stator core. For each of the phase windings of the stator coil, the apex parts of the turn portions of the phase winding are arranged in pairs over the entire circumferential range of the stator coil. The apex parts of each of the pairs overlap each other in an axial direction of the stator core. Each circumferentially-adjacent pair of the apex parts of the turn portions of all the phase windings are circumferentially offset from each other by a distance greater than the predetermined pitch at which the slots of the stator core are arranged.

With the above configuration, by arranging the apex parts of each of the pairs to axially overlap each other, it becomes possible to considerably (twice or more in comparison with the conventional stators) increase the clearance between each circumferentially-adjacent pair of the apex parts of the turn portions of all the phase windings. Consequently, even when the electric conductors are exposed at the apex parts due to damage to the insulating coats, it is still possible to secure a sufficient creepage distance between the apex parts. In addition, since each axially-overlapping pair of the apex parts are included in the same one of the phase windings, the difference in electric potential between the apex parts is small, thus making it difficult for creeping discharge to occur therebetween.

In further implementations, each of the phase windings of the stator coil may be wave-wound on the stator core so that the in-slot portion of the phase winding which is arranged at an Nth layer counting from the radially inside in each of the slots is electrically connected to the in-slot portion of the phase winding which is arranged at an (N+1)th layer counting from the radially inside in another one of the slots, where N is a natural number not less than 1. Each of the turn portions of the phase windings of the stator coil may also include a crank-shaped part that is formed, by press-shaping using shaping dies, in the apex part of the turn portion to radially offset the turn portion. In this case, it is preferable that the shaping dies used for forming the crank-shaped parts of the turn portions of each of the plurality of types are different from the shaping dies used for forming the crank-shaped parts of the turn portions of another one of the plurality of types.

Each of the turn portions of the phase windings of the stator coil may also include a pair of oblique parts and a pair of bent parts. The oblique parts may be respectively formed on opposite sides of the apex part of the turn portion so as to extend obliquely with respect to the axial end face of the stator core at a predetermined oblique angle. Each of the bent parts may be formed, by press-shaping using shaping dies, substantially into the shape of a "<" character between one of the oblique parts and one of the in-slot portions connected by the turn portion. In this case, it is preferable that the shaping dies used for forming the bent parts of the turn portions of each of the plurality of types are different from the shaping dies used for forming the bent parts of the turn portions of another one of the plurality of types.

The turn portions of the phase windings of the stator coil may include a plurality of first-type turn portions and a plurality of second-type turn portions that have a smaller circumferential length than the first-type turn portions. In this case, it is preferable that each of the second-type turn portions is entirely located axially inside one of the first-type turn portions so that an axially-outer side surface of the apex part of the second-type turn portion is covered by an axially-inner side surface of the apex part of the first-type turn portion.

It is further preferable that each of the first-type turn portions has a circumferential length of (M+1) slot-pitches while each of the second-type turn portions has a circumferential length of (M−1) slot-pitches, where M is a natural number not less than 2, and that each of the apex parts of the second-type turn portions is located axially inside and axially overlaps one of the apex parts of the first-type turn portions.

BRIEF DESCRIPTION OF THE DRAWINGS

The present invention will be understood more fully from the detailed description given hereinafter and from the accompanying drawings of one exemplary embodiment, which, however, should not be taken to limit the present invention to the specific embodiment but are for the purpose of explanation and understanding only.

In the accompanying drawings.

DESCRIPTION OF EMBODIMENT

Figure 1:
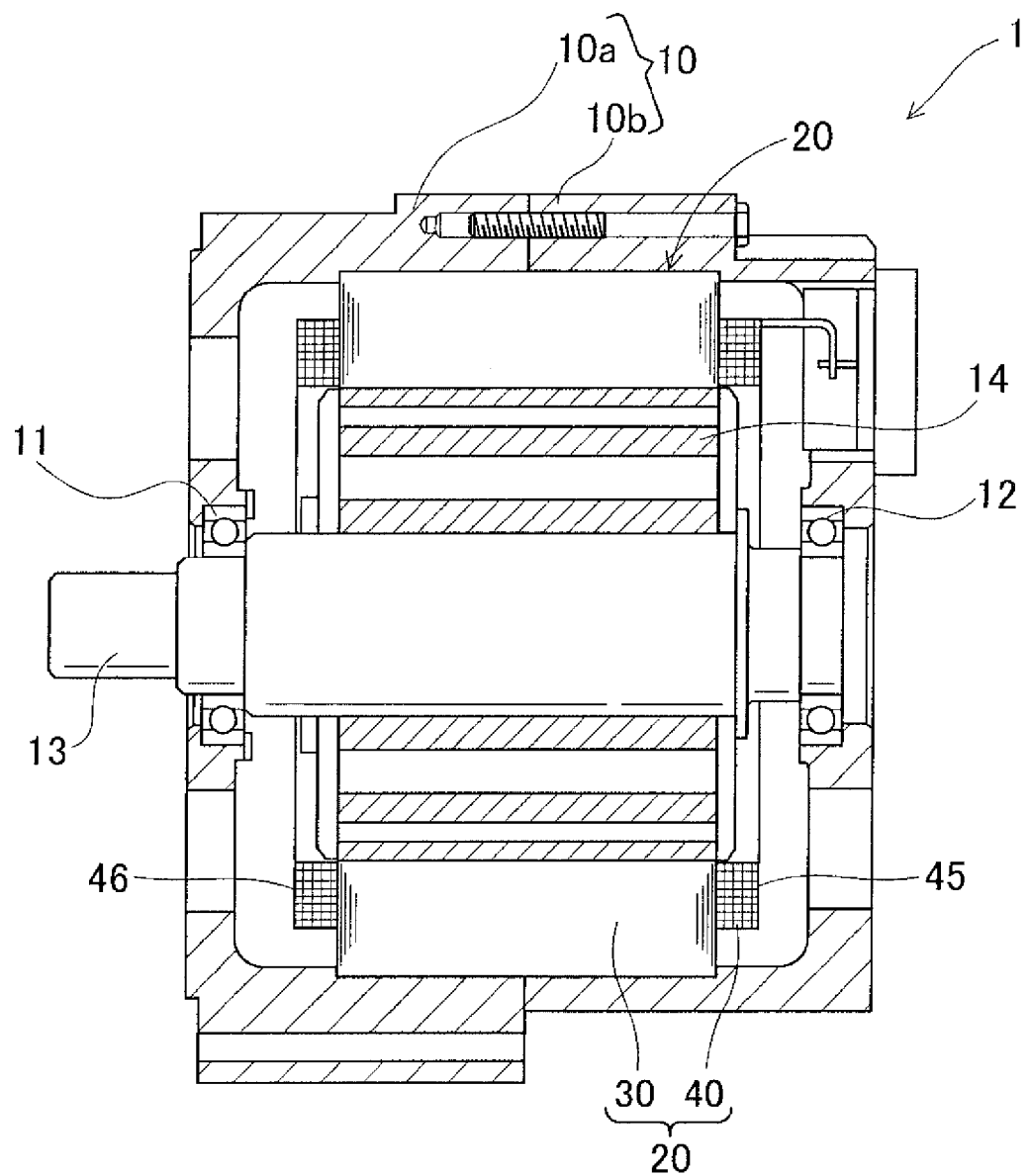
FIG. 1 is a partially cross-sectional view of a rotating electric machine which includes a stator according to the exemplary embodiment.

FIG. 1 shows the overall configuration of a rotating electric machine 1 which includes a stator 20 according to an exemplary embodiment.

The rotating electric machine 1 is designed to be used in a motor vehicle, such as a passenger car or truck, as an electric motor.

As shown in FIG. 1, the rotating electric machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 facing the radially inner periphery of the stator 20. The polarities of the magnetic poles alternate between north and south in the circumferential direction of the rotor 14. The number of the magnetic poles can be suitably set according to the design specification of the rotating electric machine 1. In the present embodiment, the number of the magnetic poles is set to be equal to, for example, eight (i.e., four north poles and four south poles).

Figure 2:
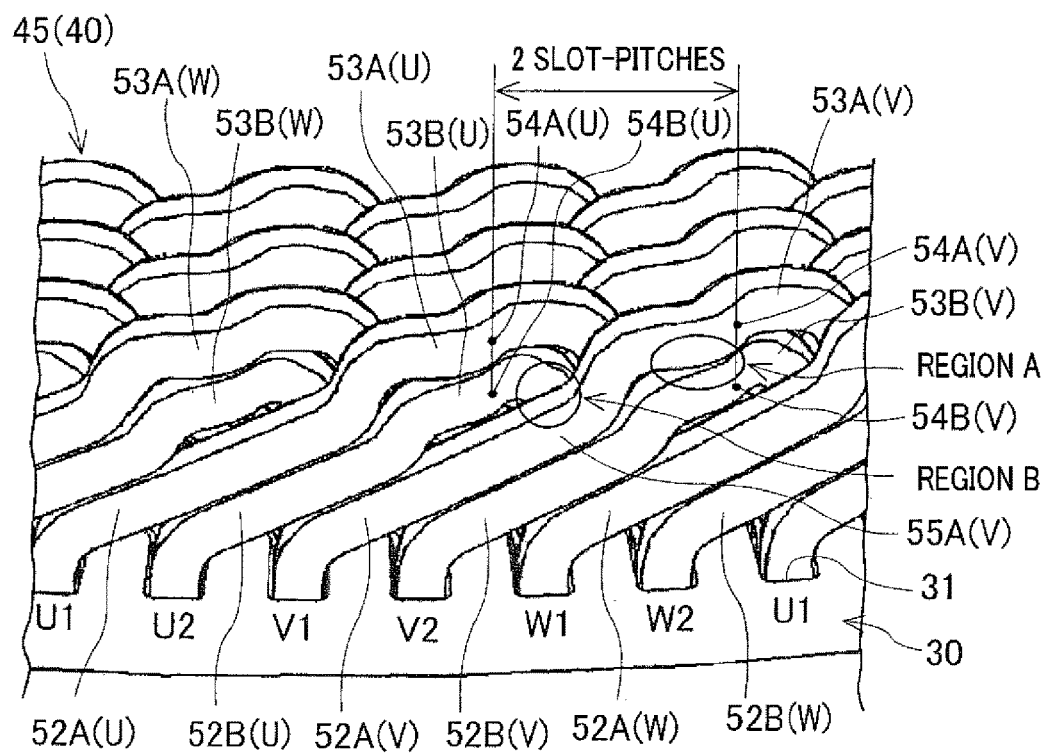
FIG. 2 is a perspective view of part of the stator.
Figure 3:
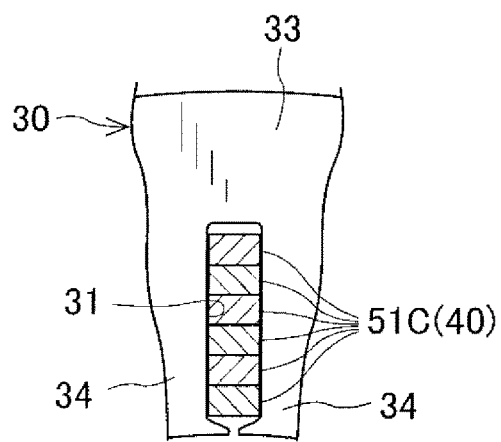
FIG. 3 is a partially cross-sectional view of part of the stator.

Referring now to FIGS. 2 and 3, the stator 20 includes an annular (or hollow cylindrical) stator core 30, which is disposed radially outside the rotor 14 so as to surround the rotor 14, and a three-phase stator coil 40 mounted on the stator core 30. In addition, the stator 20 may further have insulating paper interposed between the stator core 30 and the stator coil 40.

In the present embodiment, the stator core 30 is formed by laminating a plurality of annular magnetic steel sheets in the axial direction of the stator core 30 and fixing them together by, for example, staking. In addition, between each adjacent pair of the magnetic steel sheets, there is interposed an insulating film. It should be appreciated that other conventional metal sheets may also be used instead of the magnetic steel sheets.

Moreover, as shown in FIGS. 2 and 3, the stator core 30 includes an annular back core 33, a plurality of stator teeth 34 and a plurality of slots 31. The stator teeth 34 each extend radially inward from the back core 33 and are circumferentially spaced at a predetermined pitch. Each of the slots 31 is formed between one circumferentially-adjacent pair of the stator teeth 34. Accordingly, the slots 31 are circumferentially arranged at the same predetermined pitch as the stator teeth 34. Moreover, each of the slots 31 extends in the axial direction of the stator core 30 so as to axially penetrate the stator core 30 and opens on the radially inner surface of the stator core 30. In addition, for each of the slots 31, the depth direction of the slot 31 coincides with a radial direction of the stator core 30.

In the present embodiment, there are provided two slots 31 per magnetic pole of the rotor 14 that has the eight magnetic poles and per phase of the three-phase stator coil 40. In other words, the slot multiplier number is set to 2. Accordingly, the total number of the slots 31 provided in the stator core 30 is equal to 48 (i.e., 2×8×3). In addition, as shown in FIG. 2, the forty-eight slots 31 are comprised of pairs of U-phase slots U1 and U2, V-phase slots V1 and V2 and W-phase slots W1 and W2 which are sequentially and repeatedly arranged in the circumferential direction of the stator core 30.

The stator coil 40 is comprised of a U-phase winding 41U, a V-phase winding 41V and a W-phase winding 41W (see FIG. 8), which are mounted on the stator core 30 so as to be received in the slots 31 of the stator core 30 and be different in electrical phase from each other.

Each of the phase windings of the stator coil 40 includes a plurality of in-slot portions 51C and a plurality of turn portions 52A and 52B. Each of the in-slot portions 51C is received in one of the slots 31 of the stator core 30. Each of the turn portions 52A and 52B is located outside the slots 31 of the stator core 30 to connect one pair of the in-slot portions 51 C respectively received in two different ones of the slots 31.

In the present embodiment, the stator coil 40 is formed by: (1) inserting a plurality of substantially U-shaped electric conductor segments 50 into the slots 31 of the stator core 30 from a first axial side of the stator core 30; (2) twisting free end parts of each of the electric conductor segments 50, which protrude outside the slots 31 of the stator core 30 on a second axial side of the stator core 30, respectively toward opposite circumferential sides; and (3) joining each corresponding pair of distal ends of the twisted free end parts of the electric conductor segments 50 by, for example, welding. Consequently, all the electric conductor segments 50 are electrically connected in a predetermined pattern, forming the stator coil 40.

Figure 4:
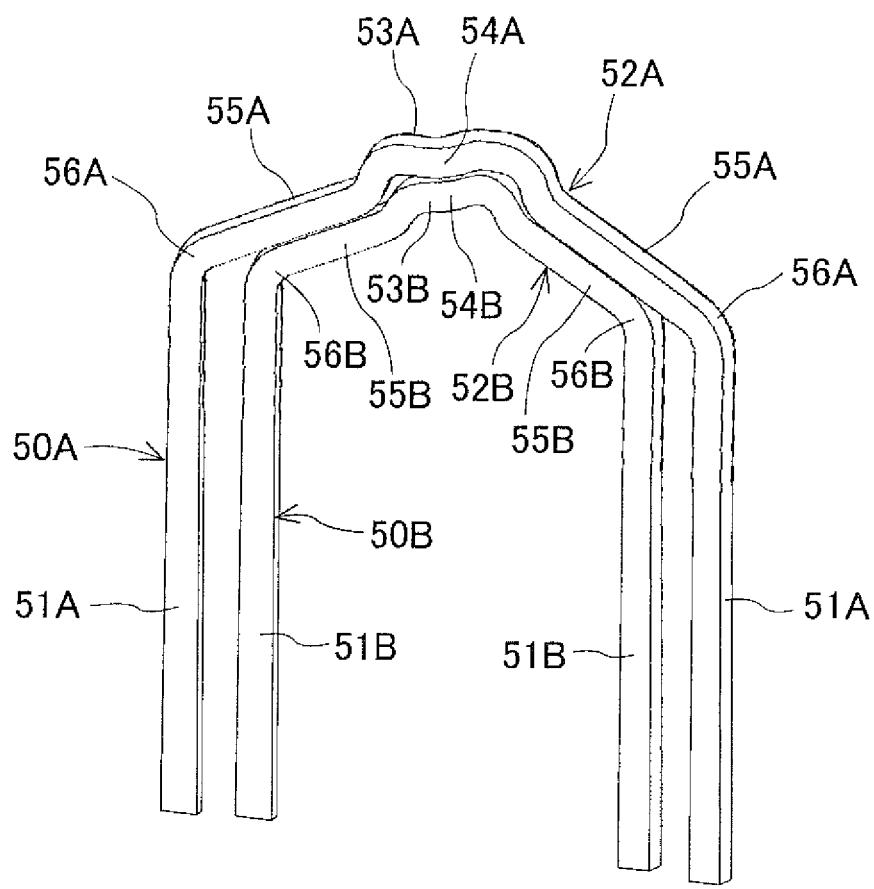
FIG. 4 is a perspective view of a pair of large and small electric conductor segments used for forming a stator coil of the stator.

Furthermore, in the present embodiment, as shown in FIG. 4, the electric conductor segments 50 forming the stator coil 40 are comprised of a plurality of large electric conductor segments 50A and a plurality of small electric conductor segments 50B that have a smaller size than the large electric conductor segments 50A. The large and small electric conductor segments 50A and 50B are formed by press-shaping an electric conductor wire, which has a substantially rectangular cross section, into the substantially U-shape using shaping dies. It should be noted that the shaping dies used for forming the large electric conductor segments 50A are different from those used for forming the small electric conductor segments 50B.

Each of the large electric conductor segments 50A has a pair of straight portions 51A extending parallel to each other and a turn portion 52A that connects ends of the straight portions 51A on the same side. On the other hand, each of the small electric conductor segments 50B has a pair of straight portions 51B extending parallel to each other and a turn portion 52B that connects ends of the straight portions 51B on the same side. The turn portions 52B of the small electric conductor segments 50B have a smaller length than the turn portions 52A of the large electric conductor segments 50A.

More specifically, in the present embodiment, the turn portions 52A of the large electric conductor segments 50A are formed to have a circumferential length of seven slot-pitches. On the other hand, the turn portions 52B of the small electric conductor segments 50B are formed to have a circumferential length of five slot-pitches. Accordingly, the turn portions 52A of the large electric conductor segments 50A may be referred to as long-pitch turn portions 52A; the turn portions 52B of the small electric conductor segments 50B may be referred to as short-pitch turn portions 52B.

Moreover, each of the turn portions 52A of the large electric conductor segments 50A includes an apex part 53A that is positioned at the center of the turn portion 52A in the extending direction of the turn portion 52A (or in the circumferential direction of the stator core 30) and furthest in the turn portion 52A from a first axial end face 30a of the stator core 30; the first axial end face 30a is on the first axial side of the stator core 30. The apex part 53A extends in the circumferential direction of the stator core 30 and parallel to the first axial end face 30a of the stator core 30. Further, at the center of the apex part 53A, there is formed, by press-shaping, a crank-shaped part 54A that is bent to radially offset the turn portion 52A. The amount of radial offset made by the crank-shaped part 54A is set to be substantially equal to the radial thickness of the large and small electric conductor segments 50A and 50B. Similarly, each of the turn portions 52B of the small electric conductor segments 50B includes an apex part 53B that is positioned at the center of the turn portion 52B in the extending direction of the turn portion 52B (or in the circumferential direction of the stator core 30) and furthest in the turn portion 52B from the first axial end face 30a of the stator core 30. The apex part 53B extends in the circumferential direction of the stator core 30 and parallel to the first axial end face 30a of the stator core 30. Further, at the center of the apex part 53B, there is formed, by press-shaping, a crank-shaped part 54B that is bent to radially offset the turn portion 52B. The amount of radial offset made by the crank-shaped part 54B is also set to be substantially equal to the radial thickness of the large and small electric conductor segments 50A and 50B.

Figure 5:
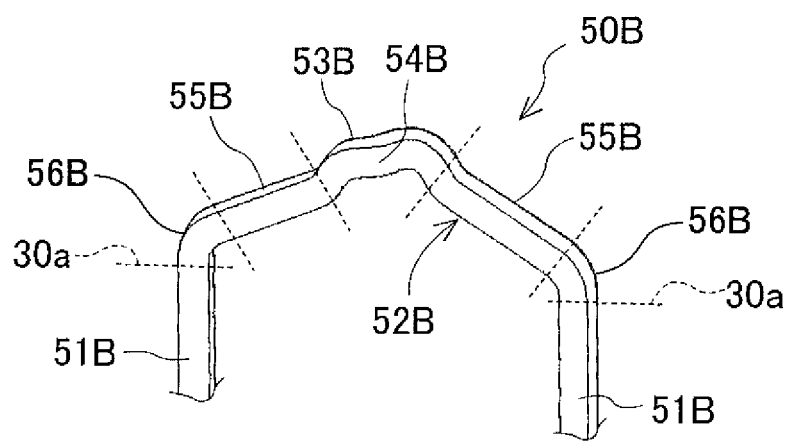
FIG. 5 is a perspective view of part of the small electric conductor segment.
Figure 9:
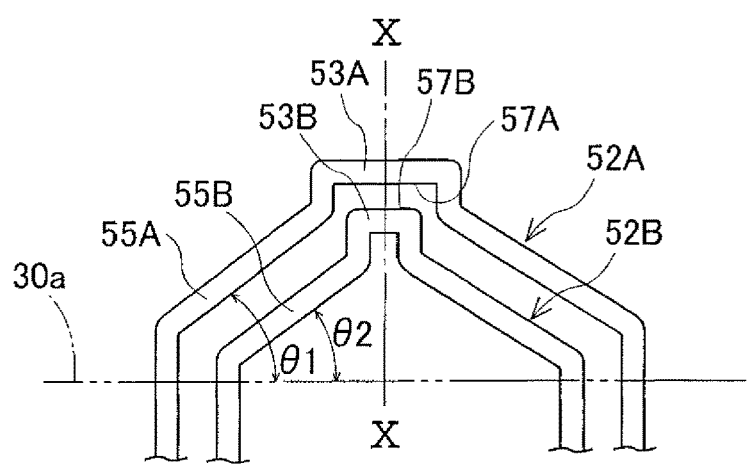
FIG. 9 is a schematic view illustrating the arrangement of the pair of large and small electric conductor segments in the stator.

Furthermore, each of the turn portions 52A of the large electric conductor segments 50A also includes a pair of oblique parts 55A that are respectively formed on opposite sides of the apex part 53A so as to extend obliquely with respect to the first axial end face 30a of the stator core 30 at a first predetermined oblique angle $\theta 1$ (see FIG. 9). Each of the turn portions 52A of the large electric conductor segments 50A further includes a pair of bent parts 56A. Each of the bent parts 56A is formed, by press-shaping using shaping dies, substantially into the shape of a "<" character between one of the oblique parts 55A and one of the straight portions 51A connected by the turn portion 52A. The bent parts 56A protrude from the first axial end face 30a of the stator core 30. Similarly, each of the turn portions 52B of the small electric conductor segments 50B also includes a pair of oblique parts 55B that are respectively formed on opposite sides of the apex part 53B so as to extend obliquely with respect to the first axial end face 30a of the stator core 30 at a second predetermined oblique angle $\theta 2$ (see FIG. 9). Each of the turn portions 52B of the small electric conductor segments 50B further includes a pair of bent parts 56B. Each of the bent parts 56B is formed, by press-shaping using shaping dies, substantially into the shape of the "<"character between one of the oblique parts 55B and one of the straight portions 51B connected by the turn portion 52B. The bent parts 56B protrude from the first axial end face 30a of the stator core 30 (see FIG. 5). In addition, in the present embodiment, the first predetermined oblique angle $\theta 1$ and the second predetermined oblique angle $\theta 2$ are set to be equal to each other (see FIG. 9).

Figure 6:
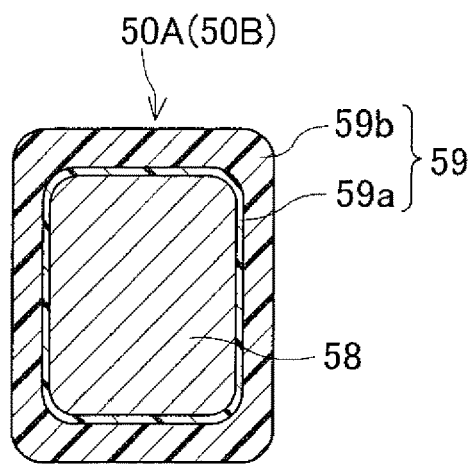
FIG. 6 is a cross-sectional view illustrating the configuration of the electric conductor segments used for forming the stator coil.

In the present embodiment, as shown in FIG. 6, each of the large and small electric conductor segments 50A and 50B is configured with an electric conductor 58 and an insulating coat 59 that covers the outer surface of the electric conductor 58. The electric conductor 58 has a substantially rectangular cross-sectional shape. The insulating coat 59 is two-layer structured to include an inner layer 59a and an outer layer 59b.

Next, the arrangement of the large and small electric conductor segments 50A and 50B in the slots 31 of the stator core 30 will be described with reference to FIG. 7.

Figure 7:
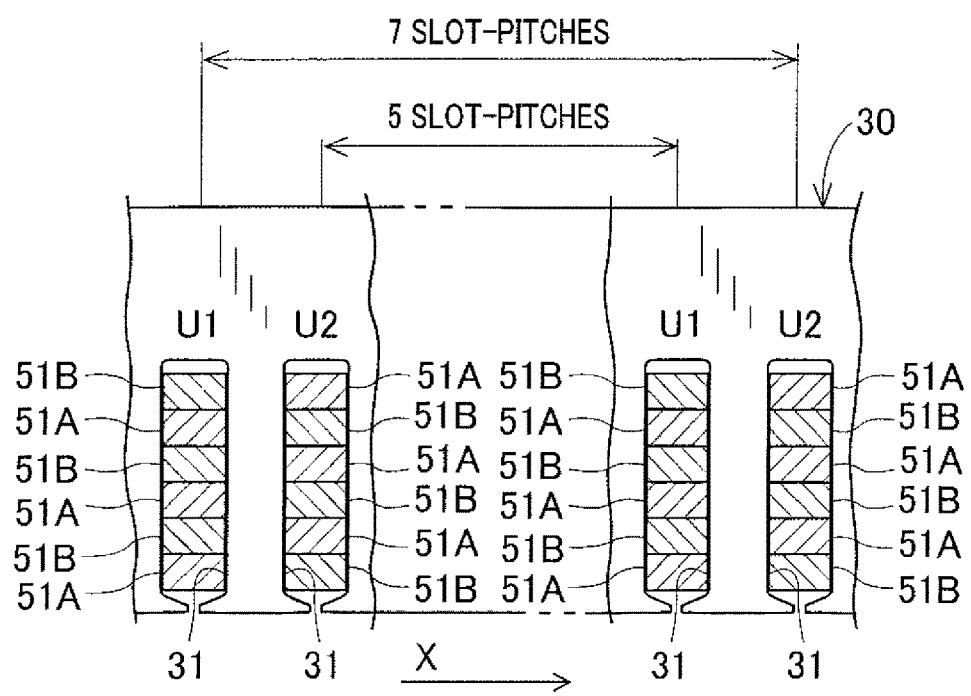
FIG. 7 is a circumferential development view illustrating the arrangement of the electric conductor segments in slots of a stator core of the stator.

In addition, for the sake of simplicity, in FIG. 7, there are shown only two pairs of U-phase slots U1 and U2 in which the U-phase winding 41U of the stator coil 40 is received. In the present embodiment, since the slot multiplier number is set to 2, the U-phase slots U1 are circumferentially spaced at six slot-pitches and the U-phase slots U2 are also circumferentially spaced at six slot-pitches.

For one of the large electric conductor segments 50A, one of the two straight portions 51A of the large electric conductor segment 50A is arranged at the first layer counting from the radially inside in one of the U-phase slots U1; the other straight portion 51A is arranged at the second layer counting from the radially inside in that one of the U-phase slots U2 which is away from the one of the U-phase slots U1 by seven slot-pitches in the clockwise direction (i.e., the X direction in FIG. 7). On the other hand, for one of the small electric conductor segments 50B, one of the two straight portions 51B of the small electric conductor segment 50B is arranged at the first layer counting from the radially inside in one of the U-phase slots U2; the other straight portion 51B is arranged at the second layer counting from the radially inside in that one of the U-phase slots U1 which is away from the one of the U-phase slots U2 by five slot-pitches in the clockwise direction.

The above arrangement of the large and small electric conductor segments 50A and 50B is repeated at the first and second layers in all the pairs of U-phase slots U1 and U2. Moreover, though not shown in the figures, the large and small electric conductor segments 50A and 50B are also arranged at the first and second layers in the pairs of V-phase slots V1 and V2 and at the first and second layers in the pairs of W-phase slots W1 and W2 in the same manner as at the first and second layers in the pairs of U-phase slots U1 and U2.

Further, for one of the large electric conductor segments 50A, one of the two straight portions 51A of the large electric conductor segment 50A is arranged at the third layer counting from the radially inside in one of the U-phase slots U1; the other straight portion 51A is arranged at the fourth layer counting from the radially inside in that one of the U-phase slots U2 which is away from the one of the U-phase slots U1 by seven slot-pitches in the clockwise direction (i.e., the X direction in FIG. 7). On the other hand, for one of the small electric conductor segments 50B, one of the two straight portions 51B of the small electric conductor segment 50B is arranged at the third layer counting from the radially inside in one of the U-phase slots U2; the other straight portion 51B is arranged at the fourth layer counting from the radially inside in that one of the U-phase slots U1 which is away from the one of the U-phase slots U2 by five slot-pitches in the clockwise direction.

The above arrangement of the large and small electric conductor segments 50A and 50B is repeated at the third and fourth layers in all the pairs of U-phase slots U1 and U2. Moreover, though not shown in the figures, the large and small electric conductor segments 50A and 50B are also arranged at the third and fourth layers in the pairs of V-phase slots V1 and V2 and at the third and fourth layers in the pairs of W-phase slots W1 and W2 in the same manner as at the third and fourth layers in the pairs of U-phase slots U1 and U2.

Furthermore, for one of the large electric conductor segments 50A, one of the two straight portions 51A of the large electric conductor segment 50A is arranged at the fifth layer counting from the radially inside in one of the U-phase slots U1; the other straight portion 51A is arranged at the sixth layer counting from the radially inside in that one of the U-phase slots U2 which is away from the one of the U-phase slots U1 by seven slot-pitches in the clockwise direction (i.e., the X direction in FIG. 7). On the other hand, for one of the small electric conductor segments 50B, one of the two straight portions 51B of the small electric conductor segment 50B is arranged at the fifth layer counting from the radially inside in one of the U-phase slots U2; the other straight portion 51B is arranged at the sixth layer counting from the radially inside in that one of the U-phase slots U1 which is away from the one of the U-phase slots U2 by five slot-pitches in the clockwise direction.

The above arrangement of the large and small electric conductor segments 50A and 50B is repeated at the fifth and sixth layers in all the pairs of U-phase slots U1 and U2. Moreover, though not shown in the figures, the large and small electric conductor segments 50A and 50B are also arranged at the fifth and sixth layers in the pairs of V-phase slots V1 and V2 and at the fifth and sixth layers in the pairs of W-phase slots W1 and W2 in the same manner as at the fifth and sixth layers in the pairs of U-phase slots U1 and U2.

Consequently, in each of the U-phase slots U1 and U2, V-phase slots V1 and V2 and W-phase slots W1 and W2, there are arranged a total of six straight portions 51A and 51B of the large and small electric conductor segments 50A and 50B in radial alignment with each other. More particularly, in the present embodiment, in each of the U-phase slots U1 and U2, V-phase slots V1 and V2 and W-phase slots W1 and W2, three straight portions 51A of the large electric conductor segments 50A are arranged alternately with three straight portions 51B of the small electric conductor segments 50B in the radial direction of the stator core 30.

Moreover, for each of the large and small electric conductor segments 50A and 50B, free end parts of the straight portions of the electric conductor segment, which protrude outside the slots 31 of the stator core 30 on the second axial side (i.e., the lower side in FIG. 2) of the stator core 30, are twisted respectively toward opposite circumferential sides so as to extend obliquely at a predetermined angle with respect to a second axial end face 30a of the stator core 30; the second axial end face 30a is on the second axial side of the stator core 30. Consequently, the free end parts of the straight portions are respectively transformed into a pair of oblique portions (not shown) of the electric wire segment; the oblique portions have a circumferential length corresponding to substantially half a magnetic pole pitch. Thereafter, on the second axial side of the stator core 30, each corresponding pair of distal ends of the oblique portions of the large and small electric conductor segments 50A and 50B are joined by, for example, welding. Consequently, all the large and small electric conductor segments 50A and 50B are electrically connected in the predetermined pattern, forming the stator coil 40.

Specifically, those parts of the straight portions 51A and 51B of the large and small electric conductor segments 50A and 50B which are received in the slots 31 of the stator core 30 respectively constitute the in-slot portions 51C of the phase windings 41U, 41V and 41W of the stator coil 40; the turn portions 52A and 52B of the large and small electric conductor segments 50A and 50B respectively constitute the turn portions 52A and 52B of the phase windings 41U, 41V and 41W of the stator coil 40. Moreover, each of the phase windings 41U, 41V and 41W of the stator coil 40 is formed of a predetermined number of the large and small electric conductor segments 50A and 50B that are electrically connected with one another. More specifically, each of the phase windings 41U, 41V and 41W of the stator coil 40 is wave-wound on the stator core 30 so that the in-slot portion 51C of the phase winding which is arranged at the Nth layer counting from the radially inside in each of the slots 31 is electrically connected to the in-slot portion 51C of the phase winding which is arranged at the (N+1)th layer counting from the radially inside in another one of the slots 31, where N is a natural number not less than 1.

In addition, in the present embodiment, each of the phase windings 41U, 41V and 41W of the stator coil 40 extends along the circumferential direction of the stator core 30 by six turns. Therefore, each of the phase windings 41U, 41V and 41W also includes electric conductor segments (not shown) that are shaped differently from the above-described large and small electric conductor segments 50A and 50B. These differently-shaped electric conductor segments include, for example, electric conductor segments for forming output and neutral terminals of the phase winding and electric conductor segments for connecting different turns of the phase winding.

Figure 8:
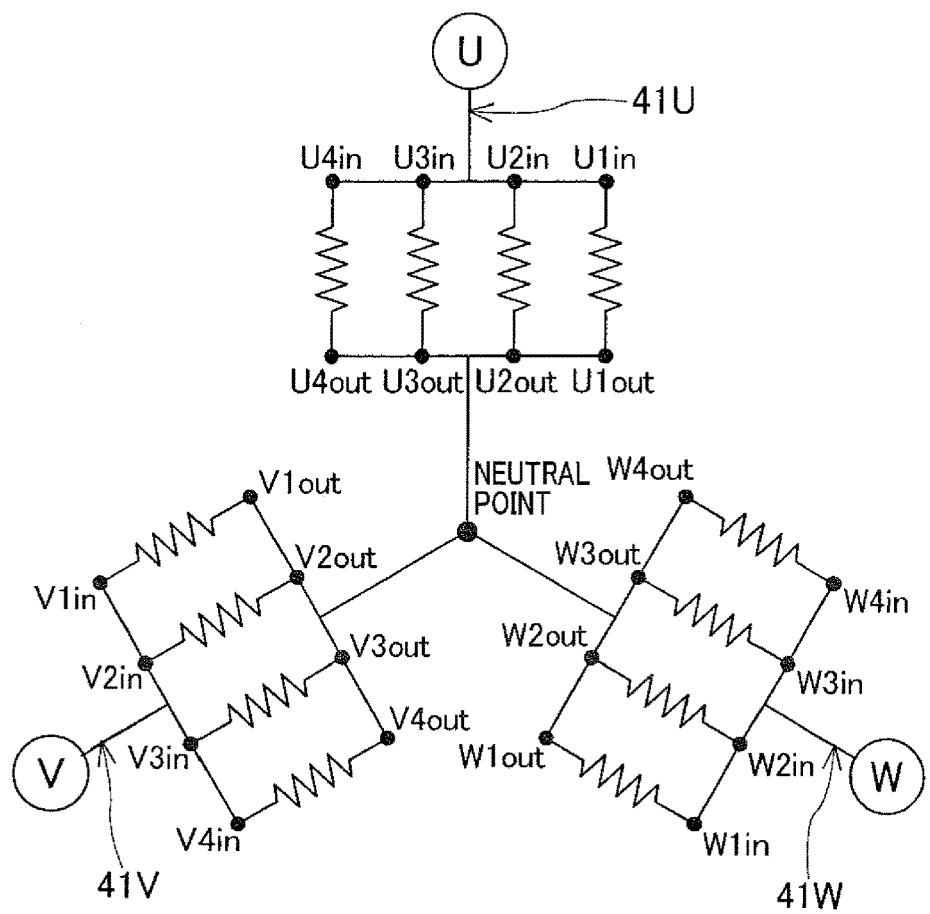
FIG. 8 is a schematic circuit diagram of the stator coil.

As shown in FIG. 8, in the present embodiment, the phase windings 41U, 41V and 41W of the stator coil 40 are star-connected to each other. Moreover, the U-phase winding 41U is comprised of four U-phase sub-windings U1, U2, U3 and U4 that are connected parallel to each other. The V-phase winding 41V is comprised of four V-phase sub-windings V1, V2, V3 and V4 that are connected parallel to each other. The W-phase winding 41W is comprised of four W-phase sub-windings W1, W2, W3 and W4 that are connected parallel to each other.

Moreover, as shown in FIG. 1, the stator coil 40 has an annular first coil end part 45 on the first axial side of the stator core 30 and an annular second coil end part 46 on the second axial side of the stator core 30. The first coil end part 45 is constituted of the turn portions 52A and 52B of the large and small electric conductor segments 50A and 50B which protrude from the first axial end face 30a of the stator core 30. The second coil end part 46 is constituted of the oblique portions (or twisted free end parts) of the large and small electric conductor segments 50A and 50B which protrude from the second axial end face 30a of the stator core 30.

In the present embodiment, as shown in FIG. 2, in the first coil end part 45 of the stator coil 40, there are circumferentially-adjacent pairs of the long-pitch and short-pitch turn portions 52A and 52B over the entire circumferential range of the stator coil 40. For each of the circumferentially-adjacent pairs of the long-pitch and short-pitch turn portions 52A and 52B, the apex parts 53A and 53B of the circumferentially-adjacent pair of the long-pitch and short-pitch turn portions 52A and 52B overlap each other in the axial direction of the stator core 30. Further, as shown in FIGS. 9-10, for each of the circumferentially-adjacent pairs of the long-pitch and short-pitch turn portions 52A and 52B, the short-pitch turn portion 52B is entirely located axial inside the long-pitch turn portion 52A; an axially-outer side surface 57B of the apex part 53B of the short-pitch turn portion 52B is covered by an axially-inner side surface 57A of the apex part 53A of the long-pitch turn portion 52A.

Moreover, each axially-overlapping pair of the apex parts 53A and 53B are of the same phase, in other words, are included in the same one of the U-phase, V-phase and W-phase windings 41U, 41V and 41W of the stator coil 40. More specifically, as shown in FIG. 2, each of the apex parts 53A (U) of the long-pitch turn portions 52A (U) of the U-phase winding 41U axially overlaps one of the apex parts 53B (U) of the short-pitch turn portions 52B (U) of the U-phase winding 41U. Each of the apex parts 53A (V) of the long-pitch turn portions 52A (V) of the V-phase winding 41V axially overlaps one of the apex parts 53B (V) of the short-pitch turn portions 52B (V) of the V-phase winding 41V. Each of the apex parts 53A (W) of the long-pitch turn portions 52A (W) of the W-phase winding 41W axially overlaps one of the apex parts 53B (W) of the short-pitch turn portions 52B (W) of the W-phase winding 41W.

Figure 10:
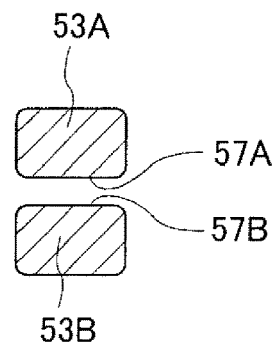
FIG. 10 is a cross-sectional view taken along the line X-X in FIG. 9.
Figure 11:
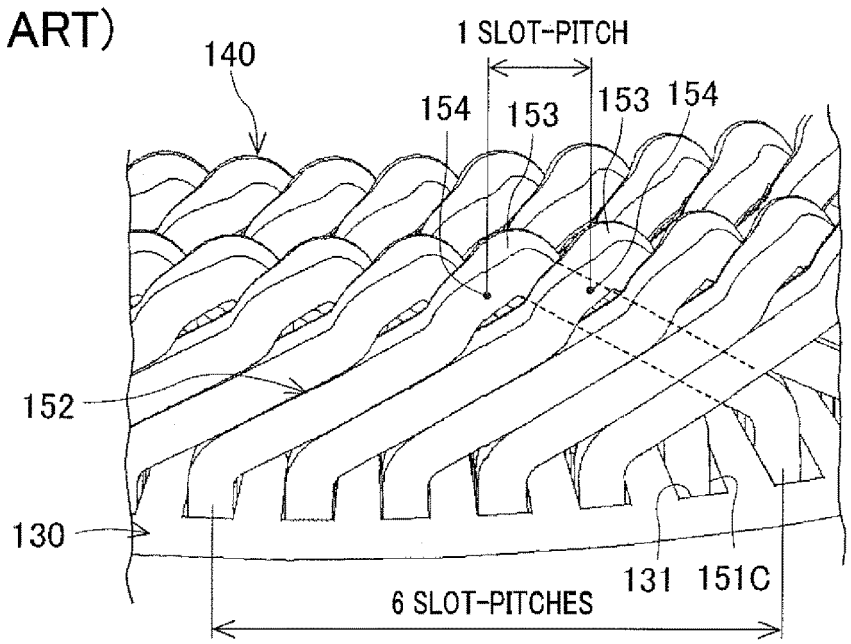
FIG. 11 is a perspective view of part of a first conventional stator.
Figure 12:
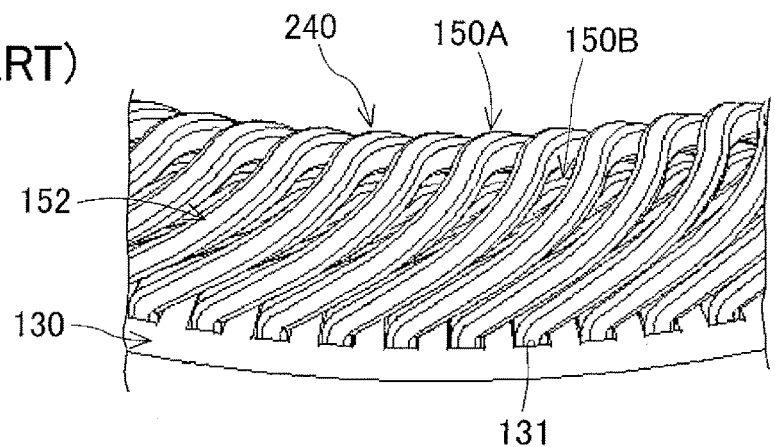
FIG. 12 is a perspective view of part of a second conventional stator.
Figure 13:
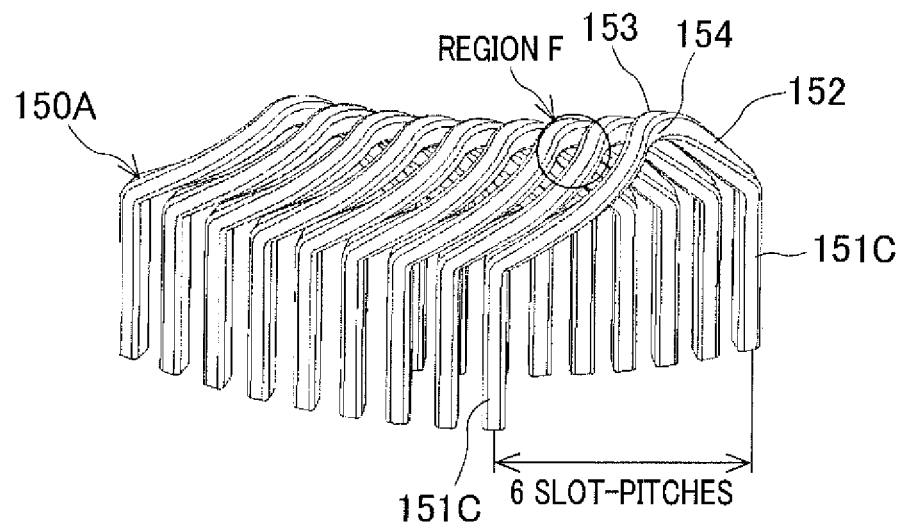
FIG. 13 is a perspective view of large electric conductor segments used for forming a stator coil of the second conventional stator.
Figure 14:
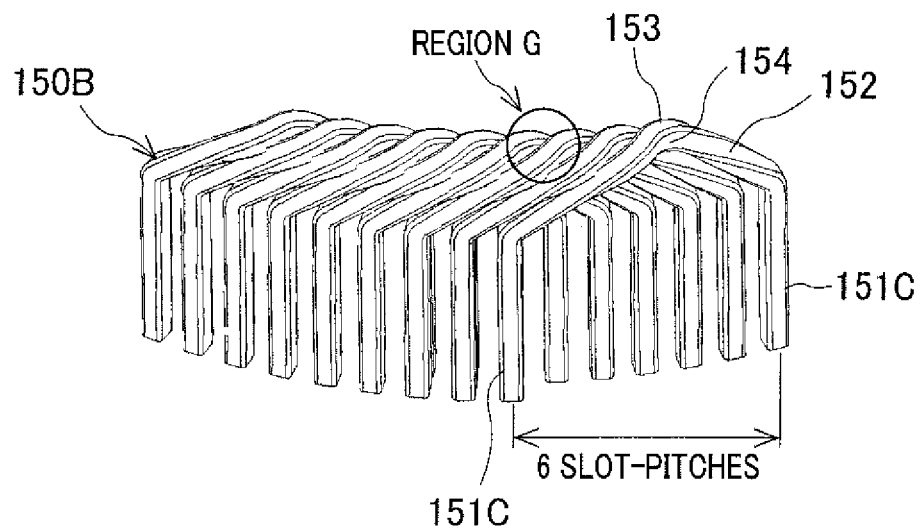
FIG. 14 is a perspective view of small electric conductor segments used for forming the stator coil of the second conventional stator.

Furthermore, as shown in FIGS. 9-10 and the region A of FIG. 2, for each axially-overlapping pair of the apex parts 53A and 53B, the axially-inner side surface 57A of the apex part 53A and the axially-outer side surface 57B of the apex part 53B are arranged parallel to and axially facing each other.

Moreover, as shown in FIG. 2, each circumferentially-adjacent pair of the apex parts 53A and 53B of the long-pitch and short-pitch turn portions 52A and 52B of all the phase windings 41U, 41V and 41W are circumferentially offset from each other by a distance greater than the predetermined pitch at which the slots 31 of the stator core 30 are arranged (i.e., greater than one slot-pitch). More specifically, in the present embodiment, each of the crank-shaped parts 54A formed in the apex parts 53A of the long-pitch turn portions 52A is circumferentially adjacent to and offset by two slot-pitches from another one of the crank-shaped parts 54A; each of the crank-shaped parts 54B formed in the apex parts 53B of the short-pitch turn portions 52B is circumferentially adjacent to and offset by two slot-pitches from another one of the crank-shaped parts 54B. Further, as shown in the region B of FIG. 2, each of the apex parts 53B of the short-pitch turn portions 52B is arranged to circumferentially neighbor on one of the straight-extending oblique parts 55A of the long-pitch turn portions 52A.

In addition, the circumferential length of the long-pitch turn portions 52A is set to (M+1) slot-pitches while the circumferential length of the short-pitch turn portions 52B is set to (M−1) slot-pitches, where M is a natural number greater than or equal to 2. More particularly, in the present embodiment, with M=6, the circumferential length of the long-pitch turn portions 52A is set to seven slot-pitches and the circumferential length of the short-pitch turn portions 52B is set to five slot-pitches.

The above-described stator 20 according to the present embodiment has the following advantages.

In the present embodiment, the stator 20 includes the annular stator core 30 and the three-phase stator coil 40. The stator core 30 has the slots 31 arranged in the circumferential direction of the stator core 30. The stator coil 40 is comprised of the U-phase, V-phase and W-phase windings 41U, 41V and 41W that are mounted on the stator core 30 so as to be different in electrical phase from each other. Each of the phase windings 41U, 41V and 41W is formed of the large and small electric conductor segments 50A and 50B that are electrically connected with one another. Each of the large and small electric conductor segments 50A and 50B is configured with the electric conductor 58 having the substantially rectangular cross-sectional shape and the insulating coat 59 that covers the outer surface of the electric conductor 58. Each of the phase windings 41U, 41V and 41W includes the in-slot portions 51C and the turn portions 52A and 52B. Each of the in-slot portions 51C is received in one of the slots 31 of the stator core 30. Each of the turn portions 52A and 52B is located outside the slots 31 of the stator core 30 to connect one pair of the in-slot portions 51C respectively received in two different ones of the slots 31. The turn portions 52A and 52B of the phase windings 41U, 41V and 41W of the stator coil 40 include two types of turn portions having different circumferential lengths, i.e., the long-pitch turn portions 52A and the short-pitch turn portions 52B. Each of the turn portions 52A includes the apex part 53A that is furthest in the turn portion 52A from the first axial end face 30a of the stator core 30 and extends in the circumferential direction of the stator core 30. Each of the turn portions 52B includes the apex part 53B that is furthest in the turn portion 52B from the first axial end face 30a of the stator core 30 and extends in the circumferential direction of the stator core 30. For each of the phase windings 41U, 41V and 41W of the stator coil 40, the apex parts 53A and 53B of the turn portions 52A and 52B of the phase winding are arranged in pairs over the entire circumferential range of the stator coil 40. The apex parts 53A and 53B of each of the pairs overlap each other in the axial direction of the stator core 30. Each circumferentially-adjacent pair of the apex parts 53A and 53B of the turn portions 52A and 52B of all the phase windings 41U, 41V and 41W are circumferentially offset from each other by a distance greater than one slot-pitch, more particularly by two slot-pitches in the present embodiment.

With the above configuration, by arranging the apex parts 53A and 53B of each of the pairs to axially overlap each other, it becomes possible to considerably (twice or more in comparison with the conventional stators) increase the clearance between each circumferentially-adjacent pair of the apex parts 53A and 53B of the turn portions 52A and 52B of all the phase windings 41U, 41V and 41W. Consequently, even when the electric conductors 58 are exposed at the apex parts 53A and 53B due to damage to the insulating coats 59, it is still possible to secure a sufficient creepage distance between the apex parts 53A and 53B. In addition, since each axially-overlapping pair of the apex parts 53A and 53B are included in the same one of the phase windings 41U, 41V and 41W, the difference in electric potential between the apex parts 53A and 53B is small, thus making it difficult for creeping discharge to occur therebetween.

Moreover, in the present embodiment, each of the phase windings 41U, 41V and 41W of the stator coil 40 is wave-wound on the stator core 30 so that the in-slot portion 51C of the phase winding which is arranged at the Nth layer counting from the radially inside in each of the slots 31 is electrically connected to the in-slot portion 51C of the phase winding which is arranged at the (N+1)th layer counting from the radially inside in another one of the slots 31, where N is a natural number not less than 1. Each of the long-pitch turn portions 52A of the phase windings 41U, 41V and 41W of the stator coil 40 includes the crank-shaped part 54A that is formed, by press-shaping using shaping dies, in the apex part 53A of the turn portion 52A to radially offset the turn portion 52A. Each of the short-pitch turn portions 52B of the phase windings 41U, 41V and 41W of the stator coil 40 includes the crank-shaped part 54B that is formed, by press-shaping using shaping dies, in the apex part 53B of the turn portion 52B to radially offset the turn portion 52B. The shaping dies used for forming the crank-shaped parts 54A of the long-pitch turn portions 52A are different from the shaping dies used for forming the crank-shaped parts 54B of the short-pitch turn portions 52B.

With the above configuration, it is possible to more effectively prevent an insulation failure from occurring due to damage to the insulating coats 59 during the press-shaping process. More specifically, during the press-shaping process for forming the crank-shaped parts 54A and 54B of the turn portions 52A and 52B, the insulating coats 59 of the large and small electric conductor segments 50A and 50B may be damaged due to defects (e.g., cracks or edge defects) in the shaping dies. However, in the present embodiment, since the shaping dies used for forming the crank-shaped parts 54A of the long-pitch turn portions 52A are different from those used for forming the crank-shaped parts 54B of the short-pitch turn portions 52B, the probability of occurrence of damage to the insulating coats 59 of the large and small electric conductor segments 50A and 50B is reduced, thereby more effectively preventing an insulation failure from occurring due to damage to the insulating coats 59.

In the present embodiment, each of the long-pitch turn portions 52A of the phase windings 41U, 41V and 41W of the stator coil 40 also includes the pair of oblique parts 55A and the pair of bent parts 56A. The oblique parts 55A are respectively formed on opposite sides of the apex part 53A of the turn portion 52A so as to extend obliquely with respect to the first axial end face 30a of the stator core 30 at the first predetermined oblique angle θ1. Each of the bent parts 56A is formed, by press-shaping using shaping dies, substantially into the shape of the "<" character between one of the oblique parts 55A and one of the in-slot portions 51C connected by the turn portion 52A. Each of the short-pitch turn portions 52B of the phase windings 41U, 41V and 41W of the stator coil 40 also includes the pair of oblique parts 55B and the pair of bent parts 56B. The oblique parts 55B are respectively formed on opposite sides of the apex part 53B of the turn portion 52B so as to extend obliquely with respect to the first axial end face 30a of the stator core 30 at the second predetermined oblique angle θ2. Each of the bent parts 56B is formed, by press-shaping using shaping dies, substantially into the shape of the "<" character between one of the oblique parts 55B and one of the in-slot portions 51C connected by the turn portion 52B. The shaping dies used for forming the bent parts 56A of the long-pitch turn portions 52A are different from the shaping dies used for forming the bent parts 56B of the short-pitch turn portions 52B.

With the above configuration, it is possible to more effectively prevent an insulation failure from occurring due to damage to the insulating coats 59 during the press-shaping process. More specifically, during the press-shaping process for forming the bent parts 56A and 56B of the turn portions 52A and 52B, the insulating coats 59 of the large and small electric conductor segments 50A and 50B may be damaged due to defects in the shaping dies. However, in the present embodiment, since the shaping dies used for forming the bent parts 56A of the long-pitch turn portions 52A are different from those used for forming the bent parts 56B of the short-pitch turn portions 52B, the probability of occurrence of damage to the insulating coats 59 of the large and small electric conductor segments 50A and 50B is reduced, thereby more effectively preventing an insulation failure from occurring due to damage to the insulating coats 59.

In the present embodiment, each of the short-pitch turn portions 52B is entirely located axially inside one of the long-pitch turn portions 52A so that the axially-outer side surface 57B of the apex part 53B of the short-pitch turn portion 52B is covered by the axially-inner side surface 57A of the apex part 53A of the long-pitch turn portion 52A.

With the above configuration, it is possible to more reliably electrically insulate the stator 20 from other components (e.g., the housing 10) of the rotating electric machine 1. More specifically, during the press-shaping process, the smaller the circumferential lengths of the turn portions, the higher stress is applied to the turn portions and thus the more likely it is for damage to the insulating coats 59 to occur in the turn portions. Therefore, by covering the short-pitch turn portions 52B where the probability of occurrence of damage to the insulating coats 59 is higher with the long-pitch turn portions 52A where the probability of occurrence of damage to the insulating coats 59 is lower, it is possible to improve the insulation properties of the entire stator 20, thereby more reliably electrically insulating the stator 20 from other components of the rotating electric machine 1.

In the present embodiment, each of the long-pitch turn portions 52A has the circumferential length of seven slot-pitches (i.e., (M+1) slot-pitches with M being 6), while each of the short-pitch turn portions 52B has the circumferential length of five slot-pitches (i.e., (M−1) slot-pitches with M being 6). Moreover, each of the apex parts 53B of the small-pitch turn portions 52B is located axially inside and axially overlaps one of the apex parts 53A of the long-pitch turn portions 52A.

With the above configuration, it is possible to improve the insulation properties of the stator coil 40 without changing other characteristics in comparison with a conventional stator coil in which all the turn portions have the same circumferential length of M slot-pitches.

While the above particular embodiment has been shown and described, it will be understood by those skilled in the art that various modifications, changes, and improvements may be made without departing from the spirit of the present invention.

For example, in the above-described embodiment, two types of turn portions having different circumferential lengths (i.e., the long-pitch turn portions 52A and the short-pitch turn portions 52B) are employed in the stator coil 40. Moreover, the number of the apex parts of the turn portions overlapping each other in the axial direction of the stator core 30 is equal to 2.

However, it is also possible to employ three or more types of turn portions having different circumferential lengths in the stator coil 40. In this case, the number of the apex parts of the turn portions overlapping each other in the axial direction of the stator core 30 would be accordingly equal to 3 or more.

In the above-described embodiment, each of the phase windings 41U, 41V and 41W of the stator coil 40 is formed of the substantially U-shaped large and small electric conductor segments 50A and 50B. The first coil end part 45 of the stator coil 40 is constituted of the turn portions 52A and 52B of the large and small electric conductor segments 50A and 50B which protrude from the first axial end face 30a of the stator core 30. The second coil end part 46 of the stator coil 40 is constituted of the oblique portions (or twisted free end parts) of the large and small electric conductor segments 50A and 50B which protrude from the second axial end face 30a of the stator core 30.

However, each of the phase windings 41U, 41V and 41W of the stator coil 40 may be alternatively formed of a plurality of substantially wave-shaped electric wires; each of the electric wires includes a plurality of in-slot portions 51C and a plurality of turn portions 52A and 52B. In this case, the first coil end part 45 of the stator coil 40 would be constituted of those turn portions 52A and 52B of the electric wires which protrude from the first axial end face 30a of the stator core 30; the second coil end part 46 of the stator coil 40 would be constituted of those turn portions 52A and 52B of the electric wires which protrude from the second axial end face 30a of the stator core 30.

In the above-described embodiment, the present invention is directed to the stator 20 of the rotating electric machine 1 that is designed to be used in a motor vehicle as an electric motor. However, the present invention can also be applied to stators of other rotating electric machines, such as a stator of an electric generator or a stator of a motor-generator that can selectively function both as an electric motor and as an electric generator.

What is claimed is:

1. A stator for a rotating electric machine, the stator comprising:
   an annular stator core having a plurality of slots arranged in a circumferential direction of the stator core at a predetermined pitch; and
   a stator coil comprised of a plurality of phase windings that are mounted on the stator core so as to be different in electrical phase from each other, each of the phase windings being configured with an electric conductor having a substantially rectangular cross-sectional shape and an insulating coat that covers an outer surface of the electric conductor, each of the phase windings including a plurality of in-slot portions and a plurality of turn portions, each of the in-slot portions being received in one of the slots of the stator core, each of the turn portions being located outside the slots of the stator core to connect one pair of the in-slot portions respectively received in two different ones of the slots, wherein
   the turn portions of the phase windings of the stator coil comprise a plurality of types of turn portions having different circumferential lengths,
   each of the turn portions of the phase windings includes an apex part that is furthest in the turn portion from an axial end face of the stator core and extends in the circumferential direction of the stator core,
   for each of the phase windings of the stator coil, the apex parts of the turn portions of the phase winding are arranged in pairs over an entire circumferential range of the stator coil, the apex parts of each of the pairs overlapping each other in an axial direction of the stator core, and
   each circumferentially-adjacent pair of the apex parts of the turn portions of all the phase windings are circumferentially offset from each other by a distance greater than the predetermined pitch at which the slots of the stator core are arranged.

2. The stator as set forth in claim 1, wherein each of the phase windings of the stator coil is wave-wound on the stator core so that the in-slot portion of the phase winding which is arranged at an Nth layer counting from the radially inside in each of the slots is electrically connected to the in-slot portion of the phase winding which is arranged at an (N+1)th layer counting from the radially inside in another one of the slots, where N is a natural number not less than 1, and
   each of the turn portions of the phase windings of the stator coil also includes a crank-shaped part that is formed, by press-shaping using shaping dies, in the apex part of the turn portion to radially offset the turn portion, and
   the shaping dies used for forming the crank-shaped parts of the turn portions of each of the plurality of types are different from the shaping dies used for forming the crank-shaped parts of the turn portions of another one of the plurality of types.

3. The stator as set forth in claim 1, wherein each of the turn portions of the phase windings of the stator coil also includes a pair of oblique parts and a pair of bent parts,
   the oblique parts are respectively formed on opposite sides of the apex part of the turn portion so as to extend obliquely with respect to the axial end face of the stator core at a predetermined oblique angle, each of the bent parts is formed, by press-shaping using shaping dies, substantially into the shape of a "<" character between one of the oblique parts and one of the in-slot portions connected by the turn portion, and the shaping dies used for forming the bent parts of the turn portions of each of the plurality of types are different from the shaping dies used for forming the bent parts of the turn portions of another one of the plurality of types.

4. The stator as set forth in claim 1, wherein the turn portions of the phase windings of the stator coil comprise a plurality of first-type turn portions and a plurality of second-type turn portions that have a smaller circumferential length than the first-type turn portions, and each of the second-type turn portions is entirely located axially inside one of the first-type turn portions so that an axially-outer side surface of the apex part of the second-type turn portion is covered by an axially-inner side surface of the apex part of the first-type turn portion.

5. The stator as set forth in claim 1, wherein the turn portions of the phase windings of the stator coil comprise a plurality of first-type turn portions and a plurality of second-type turn portions, each of the first-type turn portions has a circumferential length of (M+1) slot-pitches while each of the second-type turn portions has a circumferential length of (M−1) slot-pitches, where M is a natural number not less than 2, and each of the apex parts of the second-type turn portions is located axially inside and axially overlaps one of the apex parts of the first-type turn portions.

* * * * *